US011451064B2

(12) United States Patent
Abe

(10) Patent No.: US 11,451,064 B2
(45) Date of Patent: Sep. 20, 2022

(54) ENERGY MANAGEMENT SYSTEM, INDEPENDENT SYSTEM, AND METHOD FOR OPERATING INDEPENDENT SYSTEM

(71) Applicant: NGK Insulators, Ltd., Nagoya (JP)

(72) Inventor: Hiroyuki Abe, Anjo (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/224,204

(22) Filed: Apr. 7, 2021

(65) Prior Publication Data

US 2021/0226454 A1 Jul. 22, 2021

Related U.S. Application Data

(63) Continuation of application No. PCT/JP2019/026060, filed on Jul. 1, 2019.

(30) Foreign Application Priority Data

Oct. 18, 2018 (JP) .............................. JP2018-196368

(51) Int. Cl.
*H02H 3/46* (2006.01)
*H01M 10/46* (2006.01)
(Continued)

(52) U.S. Cl.
CPC ............... *H02J 3/46* (2013.01); *H01M 10/44* (2013.01); *H01M 10/465* (2013.01);
(Continued)

(58) Field of Classification Search
CPC ........ H02J 3/46; H02J 3/24; H02J 3/32; H02J 3/381; H02J 3/38; H02J 7/0068;
(Continued)

(56) References Cited

U.S. PATENT DOCUMENTS

2010/0047672 A1  2/2010  Tamakoshi
2012/0283888 A1  11/2012  Mao et al.
(Continued)

FOREIGN PATENT DOCUMENTS

JP    2000-102196 A1   4/2000
JP    2001-211570 A1   8/2001
(Continued)

OTHER PUBLICATIONS

International Search Report and Written Opinion (Application No. PCT/JP2019/026060) dated Oct. 1, 2019.
(Continued)

*Primary Examiner* — Robert L Deberadinis
(74) *Attorney, Agent, or Firm* — Burr & Brown, PLLC

(57) ABSTRACT

When in the independent system: a natural energy generating apparatus, a storage battery system, a power generator, and a first load is connected to a power supply system; the natural energy generating apparatus supplies generated power to the power supply system; the storage battery system is a regulated power supply; and the power generator performs a constant power operation, information indicating states of the natural energy generating apparatus, the storage battery system, the power generator, the first load, and a second load is obtained. Operations of the natural energy generating apparatus and the power generator, connection of the second load to the power supply system, and paralleling off the second load from the power supply system are controlled based on the information so that a demand-supply balance of power in the independent system is maintained, with the first load maintained to be connected to the power supply system.

17 Claims, 2 Drawing Sheets

(51) Int. Cl.
- *H02J 3/38* (2006.01)
- *H02J 7/00* (2006.01)
- *H02J 3/46* (2006.01)
- *H01M 10/44* (2006.01)
- *H01M 10/48* (2006.01)
- *H02J 3/14* (2006.01)
- *H02J 3/32* (2006.01)
- *H02J 7/35* (2006.01)

(52) U.S. Cl.
CPC .............. *H01M 10/48* (2013.01); *H02J 3/14* (2013.01); *H02J 3/32* (2013.01); *H02J 3/381* (2013.01); *H02J 7/0068* (2013.01); *H02J 7/35* (2013.01); *H02J 2300/24* (2020.01); *H02J 2300/28* (2020.01)

(58) Field of Classification Search
CPC ...... H02J 7/35; H02J 2300/28; H02J 2300/24; H02J 7/00; H01M 10/44; H01M 10/46
See application file for complete search history.

(56) References Cited

U.S. PATENT DOCUMENTS

| | | | |
|---|---|---|---|
| 2013/0147282 A1 | 6/2013 | Sakamoto | |
| 2014/0229031 A1* | 8/2014 | Amarin | H02J 3/00 700/295 |
| 2014/0316599 A1 | 10/2014 | Tomita et al. | |
| 2017/0358929 A1* | 12/2017 | Koeppe | H02J 13/00028 |

FOREIGN PATENT DOCUMENTS

| | | |
|---|---|---|
| JP | 2010-051074 A1 | 3/2010 |
| JP | 2012-257436 A1 | 12/2012 |
| JP | 2013-121293 A1 | 6/2013 |
| JP | 2013-176234 A1 | 9/2013 |
| JP | 2014-233136 A1 | 12/2014 |
| JP | 2015-156785 A1 | 8/2015 |
| JP | 2015-217859 A1 | 12/2015 |
| JP | 2016-039685 A1 | 3/2016 |
| JP | 2016-127760 A1 | 7/2016 |
| WO | 2013/080308 A1 | 6/2013 |

OTHER PUBLICATIONS

English translation of the International Preliminary Report on Patentability (Chapter I) (Application No. PCT/JP2019/026060) dated Apr. 29, 2021.

Extended European Search Report, European Application No. 19874134.0, dated Jun. 13, 2022 (8 pages).

* cited by examiner

ENERGY MANAGEMENT SYSTEM, INDEPENDENT SYSTEM, AND METHOD FOR OPERATING INDEPENDENT SYSTEM

BACKGROUND OF THE INVENTION

1. Field of the Invention

The present invention relates to an energy management system, an independent system, and a method for operating the independent system.

2. Description of Related Art

A system constructed in an isolated island, a remote location where power networks are under construction or the like is an independent system that is not interconnected to the other systems. Alternatively, even in the case that the system is a non-independent system that is interconnected to the other systems in normal times, it turns into an independent system in a time of emergency, for example, during a power outage in the other systems. Hereinafter, the independent system and the system that turns into an independent system in a time of emergency will be referred to as the independent system without distinction.

The independent system is vulnerable. Thus, a power outage sometimes occurs in the independent systems for a long time.

Installing many natural energy generating apparatuses together with storage battery systems in the independent system has been studied so that power can be supplied in the independent system.

For example, in an independent power supply system described in Japanese Patent Application Laid-Open No. 2013-176234, a solar power generation device and a power storage device are connected to a power line. The independent power supply system does not include a power generator for adjusting output of a rotary machine system with inertia, such as a Diesel-engine power generator. Thus, the power storage device operates for maintaining the voltage and the frequency. When it is predicted that a storage battery will be charged beyond the maximum charge power of the storage battery, power generated by the solar power generation device is reduced. Furthermore, when it is predicted that the power will be discharged from the storage battery beyond the maximum discharge power of the storage battery, the power consumption of a load for adjustment is reduced.

The amount of electricity generated by the natural energy generating apparatuses depends on the nature, is uncertain, and greatly fluctuates.

When the power generated by the natural energy generating apparatuses and the remaining capacity of the storage battery system are scarce in the independent system and the supply of power to an accessory machine of the storage battery system included in the independent system is thus stopped, devices in the storage battery system sometimes suffer a failure or deteriorate. For example, Japanese Patent Application Laid-Open No. 2010-51074 describes that decrease in temperature of a sodium-sulfur battery without a supply of power to a heater causes increase in time to resume operations, and increases the probability of a failure in an electric cell.

When the power generated by the natural energy generating apparatuses and the remaining capacity of the storage battery system are scarce in the independent system and the supply of power to a power supply system included in the independent system is thus stopped, the operation of the power supply system cannot be resumed unless the operation of restarting the power supply system is performed. However, the operation of restarting the power supply system can be performed only by a skilled person at the operation of the power supply system. Meanwhile, in many cases, a person skilled at the operation of the power supply system is not permanently stationed in the isolated island, and the remote location or the like where the independent system is constructed. A time period required until a person skilled at the operation of the power supply system arrives at the isolated island, and the remote location or the like where the independent system is constructed and performs the operations of restarting the power supply system tends to be long, and accordingly, a time period required for resuming the operation of the power supply system tends to be long. Therefore, continuing to supply power to the power supply system included in the independent system is strongly sought.

When many natural energy generating apparatuses are installed in the independent systems, these risks are considered. In many cases, minimal power generators including power supplies that supply power to the accessory machines of the storage battery systems are installed together. The power generators installed together are sometimes ordinarily-used power generators, or sometimes emergency power generators. The number of the power generators installed together is sometimes only one, or sometimes two or more.

In the independent system including the natural energy generating apparatus, the storage battery system, and the power generator, the power generator is main regulated power supply, and the storage battery system is operated in an auxiliary manner to support maintaining frequencies of the power supply system.

In the case that the power generator is installed together in the independent system, installing together the power generator having enough capacity to supply power to meet the peak demand of the power in the independent system is unreasonable in view of economy. Thus, in many cases, the power generator installed together in the independent system cannot supply power to meet the peak demand of the power in the independent system.

However, when the power generator cannot supply power to meet the peak demand of the power in the independent system, it is not easy to continue to supply power to loads for a long period, while the interruption of the storage battery system at a charging or discharging end point is avoided with the amount of power supplied from the natural energy generating apparatus and the amount of electric power demand in the loads or the like being predicted. This increases a risk of not powering the load in the independent system for which a continued supply of power is strongly sought.

SUMMARY OF THE INVENTION

The present invention is directed to an energy management system of an independent system, the independent system, and a method for operating the independent system.

An independent system includes a power supply system, a natural energy generating apparatus, a storage battery system, a power generator, a first load, and a second load.

Information indicating states of the natural energy generating apparatus, the storage battery system, the power generator, the first load, and the second load is obtained when: the natural energy generating apparatus, the storage battery system, the power generator, and the first load are connected to the power supply system; the natural energy generating apparatus supplies generated power to the power supply system; the storage battery system is a regulated power supply; and the power generator performs a constant power operation.

Operations of the natural energy generating apparatus and the power generator, connection of the second load to the power supply system, and paralleling off the second load from the power supply system are controlled based on the information so that a demand-supply balance of power in the independent system is maintained in the independent system, with the first load maintained to be connected to the power supply system.

According to the present invention, power can be continuously supplied to the first load even when the power cannot be continuously supplied to both of the first load and the second load. This can reduce the risk of not powering the load in the independent system for which the continued supply of power is strongly sought. This can stably operate the independent system.

Thus, the problem to be solved by the present invention is to reduce a risk of not powering a load in an independent system for which a continued supply of power is strongly sought and to stably operate the independent system.

The objects, features, aspects and advantages of this invention will become more apparent from the following detailed description and the accompanying drawings.

DETAILED DESCRIPTION OF THE INVENTION

1 Independent System

Figure 1:
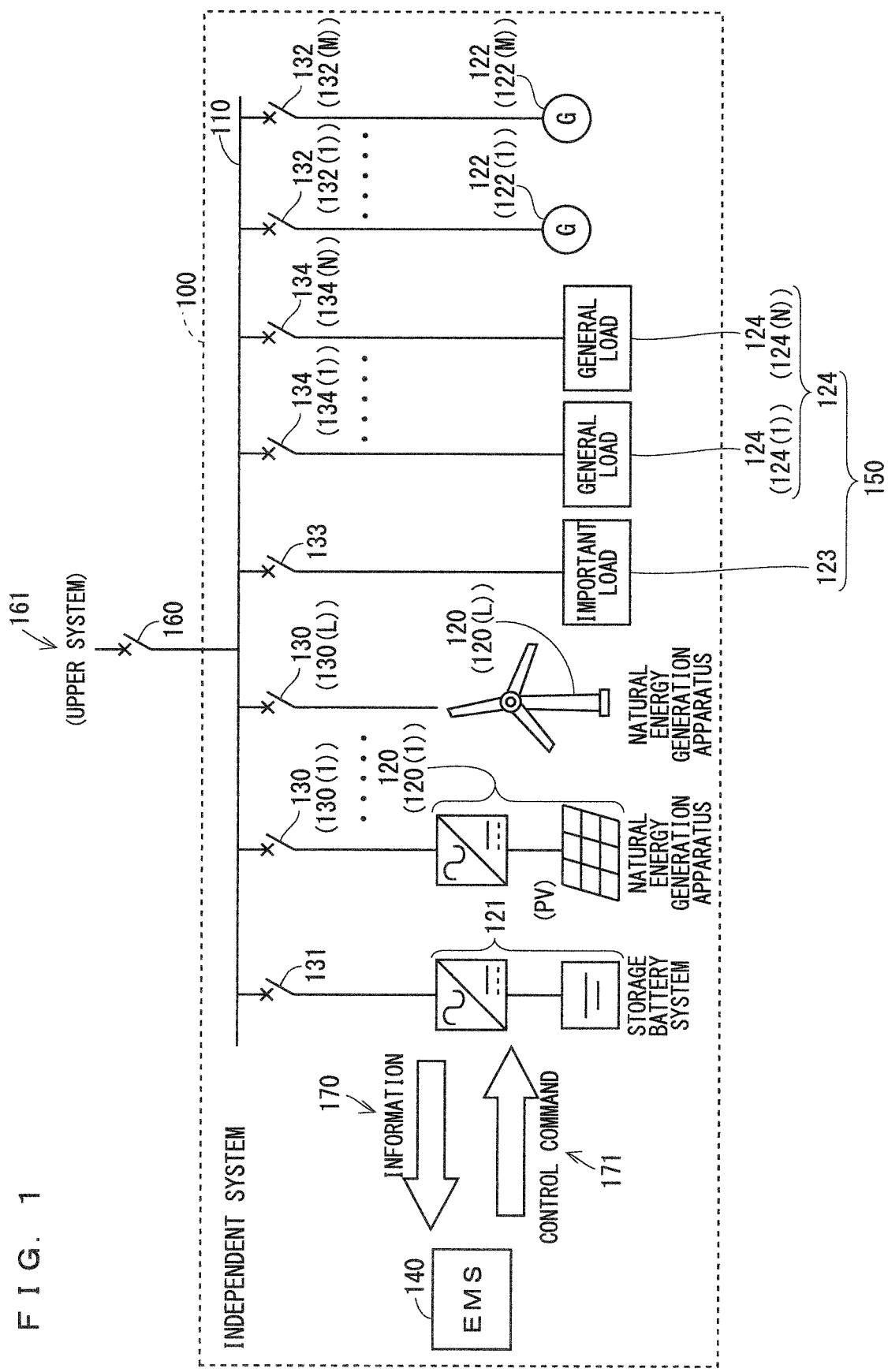
FIG. 1 schematically illustrates an independent system.

FIG. 1 schematically illustrates an independent system according to this embodiment.

An independent system 100 according to the first embodiment illustrated in FIG. 1 includes a power supply system 110, L natural energy generating apparatuses 120 (120 (1), . . . , 120(L)), a storage battery system 121, M power generators 122 (122 (1), . . . , 122 (M)), an important load 123, N general loads 124 (124 (1), . . . , 124 (N)), L circuit breakers 130 (130 (1), . . . , 130 (L)), a circuit breaker 131, M circuit breakers 132 (132 (1), . . . , 132 (M)), a circuit breaker 133, N circuit breakers 134 (134 (1), . . . , 134 (N)), and an energy management system (EMS) 140. Each of the numbers L, M, and N may be 1 or an integer larger than or equal to 2. The independent system 100 may include two or more storage battery systems. The independent system 100 may include switches instead of or in addition to the circuit breakers. The independent system 100 may include constituent elements other than these.

Loads 150 are classified into the important load 123 and general loads 124. The general loads 124 are divided into the N general loads 124 (124 (1), . . . , 124 (N)).

The power supply system 110 is electrically connected to an upper system 161 through a circuit breaker 160. The following description is made, assuming that the circuit breaker 160 is open and the power supply system 110 is not interconnected to the upper system 161. In some cases, an interconnecting means that interconnects the independent system 100 to the upper system 161 is not provided.

The natural energy generating apparatuses 120 (120 (1), . . . , 120(L)) are electrically connected to the power supply system 110 through the circuit breakers 130 (130 (1), . . . , 130 (L)), respectively. Each of the natural energy generating apparatuses 120 is any of a solar power generation device, a wind turbine generator, a hydroelectric generator, a geothermal power generator, a solar thermal power generator, a biomass power generator and the like. The natural energy generating apparatuses 120 are also referred to as renewable energy power generating equipment.

The storage battery system 121 is electrically connected to the power supply system 110 through the circuit breaker 131. The storage battery system 121 includes a storage battery. The storage battery is any of a sodium-sulfur battery, a redox flow battery, a lithium ion battery, a lead-acid battery, a nickel hydrogen battery and the like, and is preferably the sodium-sulfur battery. The storage battery system 121 can operate in an autonomous operation mode. While the storage battery system 121 operates in the autonomous operation mode, an operation of externally supplying the power discharged from the storage battery and an operation of charging the storage battery with the power externally supplied can be switched without interruption. Thus, the storage battery system 121 can be used as a regulated power supply to keep the voltage, the frequency and the like of the power supply system 110 constant.

When the independent system 100 includes two or more storage battery systems, an operation of externally supplying the power discharged from storage batteries in a whole of the two or more storage battery systems and an operation of charging the storage batteries with the power externally supplied can be switched without interruption.

The power generators 122 (122 (1), . . . , 122 (M)) are electrically connected to the power supply system 110 through the circuit breakers 132 (132 (1), . . . , 132 (M)), respectively. The power generators 122 are not natural energy generating apparatuses but power generators requiring fuel, and include a Diesel-engine power generator, a gasoline engine power generator, and a gas power generator. The power generators 122 may be ordinarily-used power generators or emergency power generators. The total capacity of the power generators 122 (122 (1), . . . , 122 (M)) is more than the demand for power in the important load 123 and less than the peak demand for power in the independent system 100.

The important load 123 is electrically connected to the power supply system 110 through the circuit breaker 133. The important load 123 is a first load requiring a continued supply of power.

The important load 123 exemplarily includes a load that causes a failure in a device included in the independent system 100 when not powered, and a load that prolongs the time necessary for resuming an operation of the device included in the independent system 100 when not powered.

The important load 123 includes, for example, accessory machines of the natural energy generating apparatuses 120 and the storage battery system 121. The accessory machines include a control device. When the storage battery included in the storage battery system 121 is a high-temperature operating storage battery such as a sodium-sulfur battery, the accessory machines of the storage battery system 121 include a heater that heats the high-temperature operating storage battery.

The important load 123 may include a load that gives, when not powered, an undesirable influence over the isolated islands, the remote locations and the like where the independent system 100 is constructed. The important load 123 may include a load to be installed in, for example, a police facility, a fire protection facility, a military facility, a hospital, or a life-line facility.

The general loads (124 (1), . . . , 124 (N)) are electrically connected to the power supply system 110 through the circuit breakers 134 (134 (1), . . . , 134 (N)), respectively. The general loads 124 are second loads different from the important load 123.

The EMS 140 obtains information 170 indicating states of the power supply system 110, the L natural energy generating apparatuses 120, the storage battery system 121, the M power generators 122, the important load 123, the N general loads 124, the L circuit breakers 130, the circuit breaker 131, the M circuit breakers 132, the circuit breaker 133, and the N circuit breakers 134.

Also, the EMS 140 issues a control command 171 for integrated control of the L natural energy generating apparatuses 120, the storage battery system 121, the M power generators 122, the important load 123, the N general loads 124, the L circuit breakers 130, the circuit breaker 131, the M circuit breakers 132, the circuit breaker 133, and the N circuit breakers 134.

In the independent system 100, the circuit breakers 130, the circuit breaker 131, the circuit breakers 132, and the circuit breaker 133 are closed. Thus, the natural energy generating apparatuses 120, the storage battery system 121, the power generators 122, and the important load 123 are connected (paralleled) to the power supply system 110. Consequently, the natural energy generating apparatuses 120 can supply the generated power to the power supply system 110. Furthermore, the storage battery system 121 can supply the power discharged from the storage battery to the power supply system 110, and charge the storage battery with the power supplied from the power supply system 110. Furthermore, the power generators 122 can supply the generated power to the power supply system 110. Furthermore, the power supply system 110 supplies the power to the important load 123.

Furthermore, the EMS 140 controls the closing and opening of the circuit breakers 134 in the independent system 100. When the circuit breakers 134 (134 (1), . . . , 134 (N)) are closed, the general loads 124 (124 (1), . . . , 124 (N)), respectively, are connected in the power supply system 110. When the circuit breakers 134 (134 (1), . . . , 134 (N)) are opened, the general loads 124 (124 (1), . . . , 124 (N)), respectively, are paralleled off from the power supply system 110.

While the natural energy generating apparatuses 120 supply the generated power to the power supply system 110, the storage battery system 121 operates in the autonomous operation mode. When some of the voltage, the frequency and the like of the power supply system 110 decrease, the storage battery system 121 supplies power to the power supply system 110. When some of the voltage, the frequency and the like of the power supply system 110 increase, the power supply system 110 supplies power to the storage battery system 121. Thus, the storage battery system 121 acts as a regulated power supply to keep the voltage, the frequency and the like of the power supply system 110 constant.

While the natural energy generating apparatuses 120 supply the generated power to the power supply system 110, the power generators 122 operate in an interconnecting operation mode. Thus, the power generators 122 perform constant power operations, and supply constant power to the power supply system 110. Consequently, the power generators 122 do not act as regulated power supplies. The EMS 140 sets the power generators 122 in a constant power operation mode using the control command 171, so that the power generators 122 operate in the interconnecting operation mode.

The power generators 122 set in the constant power operation mode generate the constant power. Thus, the power generators 122 can continue to operate near the rated power. This can enhance the efficiency of generating power by the power generators 122, and reduce fuel consumption per amount of power generated by the power generators 122. Furthermore, a failure frequency in the power generators 122 can be reduced.

2 Energy Management System

Figure 2:
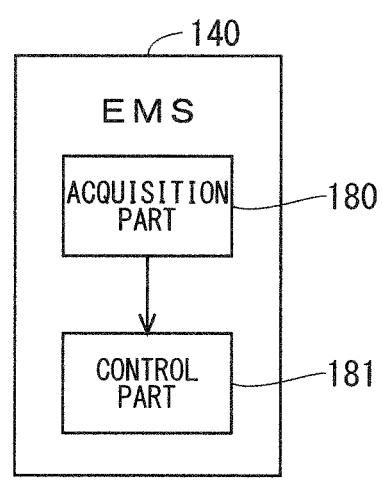
FIG. 2 is a block diagram illustrating an energy management system (EMS) included in the independent system.

FIG. 2 is a block diagram illustrating the EMS included in the independent system.

As illustrated in FIG. 2, the EMS 140 includes an acquisition part 180 and a control part 181. The acquisition part 180 and the control part 181 are configured by causing a computer to execute a program. A part of or all the functions implemented by the acquisition part 180 and the control part 181 may be implemented by hardware that does not execute the program.

3 Maintaining Short-Term Balance

The acquisition part 180 acquires the information 170 indicating the states of the L natural energy generating apparatuses 120, the storage battery system 121, the M power generators 122, the important load 123, and the N general loads 124 when the L natural energy generating apparatuses 120 supply the generated power to the power supply system 110. The states indicated by the acquired information 170 are last-minute states thereof.

The control part 181 controls, based on the acquired information, operations of the L natural energy generating apparatuses 120 and the M power generators 122, connection of the N general loads 124 to the power supply system 110, and paralleling off the N general loads 124 from the power supply system 110 so that the demand-supply balance of the power in the independent system 100 is maintained. This approximately matches the supply of power from the natural energy generating apparatuses 120 and the power generators 122 with the demand for power in the important load 123 and general loads 124 included in all the general loads 124 and connected to the power supply system 110. The storage battery system 121 eliminates a slight gap between the demand and the supply of power. While this control is performed, the connection of the important load 123 to the power supply system 110 is maintained. Furthermore, the balance to be considered in performing this control is a short-term balance.

Under this control, the power can be continuously supplied to the important load 123 even when the power cannot be continuously supplied to both of the important load 123 and the general loads 124. This can reduce the risk of not powering the important load 123 in the independent system 100 for which the continued supply of power is strongly sought. This renders stable operations of the independent system 100.

4 Maintaining Medium- and Long-Term Balance

The control part 181 preferably predicts future states of at least one of the L natural energy generating apparatuses 120, the storage battery system 121, the M power generators 122, the important load 123, and the N general loads 124.

Furthermore, the control part 181 controls, based on the predicted future state, the operations of the L natural energy generating apparatuses 120 and the M power generators 122, the connection of the N general loads 124 to the power supply system 110, and the paralleling off the N general loads 124 from the power supply system 110 so that the remaining capacity of the storage battery system 121 does not reach a charging or discharging end point within a specified period.

For example, the control part 181 performs the control so that the remaining capacity of the storage battery system 121 falls within a set range until after five hours from the current time. The balance to be considered in performing this control is a medium- and long-term balance.

The control part 181 preferably predicts the above described future states by performing an integrated simulation based on the past histories of the states of the natural energy generating apparatuses 120, the storage battery system 121, the power generators 122, the important load 123, and the general loads 124, weather conditions, and the like. A part of or all elements of the above described future states may be acquired from a sub-system that predicts the elements.

The control part 181 preferably includes a mechanism for allowing a person to correct the predicted future states. The correction may be performed regularly or irregularly.

5 Priorities Assigned to General Loads

When the general loads 124 includes the plurality of general loads 124 (124 (1), . . . , 124 (N)), a plurality of priorities P1, . . . , PN are preferably assigned to the plurality of general loads 124 (124 (1), . . . , 124 (N)). The control part 181 holds the plurality of priorities P1, . . . , PN.

Furthermore, the control part 181 controls the connection of the general loads 124 to the power supply system 110 and the paralleling off the general loads 124 from the power supply system 110 so that a general load to which a higher priority is assigned is preferentially connected to the power supply system 110 and a general load to which a lower priority is assigned is preferentially paralleled off from the power supply system 110.

The control part 181 preferably includes a mechanism for changing the priorities P1, . . . , PN according to a time period, a season, and the like.

6 Change in Control According to Relationship Between Demand and Supply of Power When determining that the supply of power in the independent system 100 is more than the demand for power in the independent system 100, the control part 181 performs at least one of: control for reducing the power generated by the natural energy generating apparatuses 120; control for reducing the power generated by the power generators 122; and control for connecting, to the power supply system 110, general loads that have not been connected to the power supply system 110 yet.

The power generated by the natural energy generating apparatuses 120 is reduced by, for example, reducing the number of the natural energy generating apparatuses 120 that generate power, applying a limiter to the power generated by each of the natural energy generating apparatuses 120, or lowering a limit value of the limiter applied to the power generated by each of the natural energy generating apparatuses 120.

The power generated by the power generators 122 is reduced by, for example, changing a power generator that generates power, reducing the number of generators 122 that generate power, or reducing the power generated by each of the power generators 122.

When determining that the supply of power in the independent system 100 is less than the demand for power in the independent system 100, the control part 181 performs at least one of: control for increasing the power generated by the natural energy generating apparatuses 120L; control for increasing the power generated by the power generators 122; and control for paralleling off, from the power supply system 110, general loads that are included in the general loads 124 and have already been connected to the power supply system 110.

The power generated by the natural energy generating apparatuses 120 is increased by, for example, increasing the number of the natural energy generating apparatuses 120 that generate power, removing the limiter applied to the power generated by each of the natural energy generating apparatuses 120, or increasing the limit value of the limiter applied to the power generated by each of the natural energy generating apparatuses 120.

The power generated by the power generators 122 is increased by, for example, changing a power generator 120 that generates power, increasing the number of generators 120 that generate power, or increasing the power generated by each of the power generators 122.

When it is difficult to refuel the power generators 122, control for avoiding fuel shortages in consideration of the amount of remaining fuel may be performed.

7 Stop of Storage Battery System

In some cases, the natural energy generating apparatuses 120 hardly generate power in a certain time period. For example, when the natural energy generating apparatuses 120 are solar power generation devices or solar thermal power generators, the natural energy generating apparatuses 120 hardly generate power at nighttime. In this case, the power generators 122 may be used as regulated power supplies by temporarily stopping the storage battery system 121 in the time period and switching the mode of the power generators 122 from the interconnecting operation mode to the autonomous operation mode.

8 Adjustment of Response Characteristics

In the case that the storage battery system 121 includes a plurality of units each of which can be independently charged and discharged, the control part 181 preferably adjusts the response characteristics of the storage battery system 121. The response characteristics correspond to droop characteristics of a governor in a rotary electric power generator.

The control part 181 performs, as adjustment of the response characteristics of the storage battery system 121, at least one of: adjustment based on the remaining capacity of the plurality of units; adjustment based on temperatures of the plurality of units; adjustment based on deterioration characteristics of the plurality of units; and adjustment based on deteriorating states of the plurality of units.

The adjustment of the response characteristics of the storage battery system 121 based on the remaining capacity of the plurality of units includes adjustment for preferentially discharging a unit with a larger remaining capacity, and adjustment for preferentially charging a unit with a smaller remaining capacity.

The adjustment of the response characteristics of the storage battery system 121 based on the temperatures of the plurality of units includes adjustment for reducing the maximum discharge power of a unit at a temperature higher than or equal to a first preset temperature T1, and adjustment for reducing the maximum charge power of a unit at a temperature higher than or equal to a second preset temperature T2.

In the case that each of the units includes a sodium-sulfur battery where an exothermic reaction occurs during discharge and an endothermic reaction occurs during charge, adjustment for reducing the maximum discharge power of the unit at a temperature higher than or equal to the first preset temperature T1 is performed, and adjustment for reducing the maximum charge power of the unit at a temperature higher than or equal to the second preset temperature T2 is not performed, for example.

In the case that each of the units includes a lithium ion battery where the exothermic reaction occurs during charge, adjustment for reducing the maximum charge power of the unit at a temperature higher than or equal to the second preset temperature T2 is performed, for example.

However, whether a storage battery discharges heat depends on not only whether the exothermic reaction occurs but also the magnitude of the Joule heat generated by an internal resistance. Thus, there are some cases that the adjustment of the response characteristics of the storage battery system 121 different from the exemplified cases is performed.

The adjustment of the response characteristics of the storage battery system 121 based on the deterioration characteristics of the plurality of units includes adjustment for preferentially charging and discharging a unit at a lower deterioration rate. For example, when the plurality of units include a unit with a sodium-sulfur battery and a unit with a lithium ion battery, the unit with the sodium-sulfur battery is preferentially charged and discharged. This is because a deterioration rate of the unit with the sodium-sulfur battery is lower than that with the lithium ion battery.

The adjustment of the response characteristics of the storage battery system 121 based on the deterioration states of the plurality of units includes adjustment for preferentially charging and discharging a less deteriorated unit.

Although the present invention is described in detail, the foregoing description is in all aspects illustrative and does not restrict the invention. Therefore, numerous modifications and variations that have yet been exemplified will be devised without departing from the scope of this invention.

The invention claimed is:

1. An energy management system for an independent system comprising a power supply system, a natural energy generating apparatus, a storage battery system, a power generator, a first load, and a second load, the energy management system including:
   an acquisition part acquiring information indicating states of the natural energy generating apparatus, the storage battery system, the power generator, the first load, and the second load when: the natural energy generating apparatus, the storage battery system, the power generator, and the first load are connected to the power supply system; the natural energy generating apparatus supplies generated power to the power supply system; the storage battery system is a regulated power supply; and the power generator performs a constant power operation; and
   a control part controlling, based on the information, operations of the natural energy generating apparatus and the power generator, connection of the second load to the power supply system, and paralleling off the second load from the power supply system so that a demand-supply balance of power in the independent system is maintained, with the first load maintained to be connected to the power supply system;
wherein the second load includes a plurality of loads, and the control part holds a plurality of priorities assigned to the plurality of loads, and controls connection of the plurality of loads to the power supply system and paralleling off the plurality of loads from the power supply system so that a load to which a higher priority is assigned is preferentially connected to the power supply system and a load to which a lower priority is assigned is preferentially paralleled off from the power supply system.

2. The energy management system according to claim 1, wherein the control part controls the operations of the natural energy generating apparatus and the power generator, the connection of the second load to the power supply system, and the paralleling off the second load from the power supply system based on a predicted future state of at least one of the natural energy generating apparatus, the storage battery system, the power generator, the first load, and the second load so that a remaining capacity of the storage battery system does not reach a charging or discharging end point within a specified period.

3. The energy management system according to claim 2, wherein the second load includes a plurality of loads, and the control part holds a plurality of priorities assigned to the plurality of loads, and controls connection of the plurality of loads to the power supply system and paralleling off the plurality of loads from the power supply system so that a load to which a higher priority is assigned is preferentially connected to the power supply system and a load to which a lower priority is assigned is preferentially paralleled off from the power supply system.

4. The energy management system according to claim 2, wherein the control part determines whether supply of power is more or less than demand for power in the independent system,
   the control part performs at least one of: control for reducing the power generated by the natural energy generating apparatus; control for reducing power generated by the power generator; and control for connecting, to the power supply system, a load that is included in the second load and has not been connected to the power supply system yet, when determining that the supply of the power is more than the demand for the power, and
   the control part performs at least one of: control for increasing the power generated by the natural energy generating apparatus; control for increasing the power generated by the power generator; and control for paralleling off, from the power supply system, a load that is included in the second load and has already been connected to the power supply system, when determining that the supply of the power is less than the demand for the power.

5. The energy management system according to claim 2, wherein when the storage battery system includes a plurality of units each of which can be independently charged and discharged, the control part performs, as adjustment of response characteristics of the storage battery system, at least one of:
adjustment for preferentially discharging a unit with a larger remaining capacity in the plurality of units;
adjustment for preferentially charging a unit with a smaller remaining capacity in the plurality of units;
adjustment for reducing a maximum discharge power of a unit at a temperature higher than or equal to a first preset temperature in the plurality of units;
adjustment for reducing a maximum charge power of a unit at a temperature higher than or equal to a second preset temperature in the plurality of units;
adjustment for preferentially charging and discharging a unit at a lower deterioration rate in the plurality of units; and
adjustment for preferentially charging and discharging a less deteriorated unit in the plurality of units.

6. The energy management system according to claim 3, wherein the control part determines whether supply of power is more or less than demand for power in the independent system,
the control part performs at least one of: control for reducing the power generated by the natural energy generating apparatus; control for reducing power generated by the power generator; and control for connecting, to the power supply system, a load that is included in the second load and has not been connected to the power supply system yet, when determining that the supply of the power is more than the demand for the power, and
the control part performs at least one of: control for increasing the power generated by the natural energy generating apparatus; control for increasing the power generated by the power generator; and control for paralleling off, from the power supply system, a load that is included in the second load and has already been connected to the power supply system, when determining that the supply of the power is less than the demand for the power.

7. The energy management system according to claim 3, wherein when the storage battery system includes a plurality of units each of which can be independently charged and discharged, the control part performs, as adjustment of response characteristics of the storage battery system, at least one of:
adjustment for preferentially discharging a unit with a larger remaining capacity in the plurality of units;
adjustment for preferentially charging a unit with a smaller remaining capacity in the plurality of units;
adjustment for reducing a maximum discharge power of a unit at a temperature higher than or equal to a first preset temperature in the plurality of units;
adjustment for reducing a maximum charge power of a unit at a temperature higher than or equal to a second preset temperature in the plurality of units;
adjustment for preferentially charging and discharging a unit at a lower deterioration rate in the plurality of units; and
adjustment for preferentially charging and discharging a less deteriorated unit in the plurality of units.

8. The energy management system according to claim 1, wherein the control part determines whether supply of power is more or less than demand for power in the independent system,
the control part performs at least one of: control for reducing the power generated by the natural energy generating apparatus; control for reducing power generated by the power generator; and control for connecting, to the power supply system, a load that is included in the second load and has not been connected to the power supply system yet, when determining that the supply of the power is more than the demand for the power, and
the control part performs at least one of: control for increasing the power generated by the natural energy generating apparatus; control for increasing the power generated by the power generator; and control for paralleling off, from the power supply system, a load that is included in the second load and has already been connected to the power supply system, when determining that the supply of the power is less than the demand for the power.

9. The energy management system according to claim 8, wherein when the storage battery system includes a plurality of units each of which can be independently charged and discharged, the control part performs, as adjustment of response characteristics of the storage battery system, at least one of:
adjustment for preferentially discharging a unit with a larger remaining capacity in the plurality of units;
adjustment for preferentially charging a unit with a smaller remaining capacity in the plurality of units;
adjustment for reducing a maximum discharge power of a unit at a temperature higher than or equal to a first preset temperature in the plurality of units;
adjustment for reducing a maximum charge power of a unit at a temperature higher than or equal to a second preset temperature in the plurality of units;
adjustment for preferentially charging and discharging a unit at a lower deterioration rate in the plurality of units; and
adjustment for preferentially charging and discharging a less deteriorated unit in the plurality of units.

10. The energy management system according to claim 1, wherein the control part determines whether supply of power is more or less than demand for power in the independent system,
the control part performs at least one of: control for reducing the power generated by the natural energy generating apparatus; control for reducing power generated by the power generator; and control for connecting, to the power supply system, a load that is included in the second load and has not been connected to the power supply system yet, when determining that the supply of the power is more than the demand for the power, and
the control part performs at least one of: control for increasing the power generated by the natural energy generating apparatus; control for increasing the power generated by the power generator; and control for paralleling off, from the power supply system, a load that is included in the second load and has already been connected to the power supply system, when determining that the supply of the power is less than the demand for the power.

11. The energy management system according to claim 1, wherein when the storage battery system includes a plurality of units each of which can be independently charged and discharged, the control part performs, as adjustment of response characteristics of the storage battery system, at least one of:
adjustment for preferentially discharging a unit with a larger remaining capacity in the plurality of units;
adjustment for preferentially charging a unit with a smaller remaining capacity in the plurality of units;
adjustment for reducing a maximum discharge power of a unit at a temperature higher than or equal to a first preset temperature in the plurality of units;
adjustment for reducing a maximum charge power of a unit at a temperature higher than or equal to a second preset temperature in the plurality of units;
adjustment for preferentially charging and discharging a unit at a lower deterioration rate in the plurality of units; and
adjustment for preferentially charging and discharging a less deteriorated unit in the plurality of units.

12. The energy management system according to claim 1, wherein when the storage battery system includes a plurality of units each of which can be independently charged and discharged, the control part performs, as adjustment of response characteristics of the storage battery system, at least one of:
adjustment for preferentially discharging a unit with a larger remaining capacity in the plurality of units;
adjustment for preferentially charging a unit with a smaller remaining capacity in the plurality of units;
adjustment for reducing a maximum discharge power of a unit at a temperature higher than or equal to a first preset temperature in the plurality of units;
adjustment for reducing a maximum charge power of a unit at a temperature higher than or equal to a second preset temperature in the plurality of units;
adjustment for preferentially charging and discharging a unit at a lower deterioration rate in the plurality of units; and
adjustment for preferentially charging and discharging a less deteriorated unit in the plurality of units.

13. An independent system comprising a power supply system, a natural energy generating apparatus, a storage battery system, a power generator, a first load, a second load, and an energy management system,
the energy management system including:
an acquisition part acquiring information indicating states of the natural energy generating apparatus, the storage battery system, the power generator, the first load, and the second load when: the natural energy generating apparatus, the storage battery system, the power generator, and the first load are connected to the power supply system; the natural energy generating apparatus supplies generated power to the power supply system; the storage battery system is a regulated power supply; and the power generator performs a constant power operation; and
a control part controlling, based on the information, operations of the natural energy generating apparatus and the power generator, connection of the second load to the power supply system, and paralleling off the second load from the power supply system so that a demand-supply balance of power in the independent system is maintained, with the first load maintained to be connected to the power supply system;
wherein the second load includes a plurality of loads, and
the control part holds a plurality of priorities assigned to the plurality of loads, and controls connection of the plurality of loads to the power supply system and paralleling off the plurality of loads from the power supply system so that a load to which a higher priority is assigned is preferentially connected to the power supply system and a load to which a lower priority is assigned is preferentially paralleled off from the power supply system.

14. The independent system according to claim 13, wherein the control part controls the operations of the natural energy generating apparatus and the power generator, the connection of the second load to the power supply system, and the paralleling off the second load from the power supply system based on a predicted future state of at least one of the natural energy generating apparatus, the storage battery system, the power generator, the first load, and the second load so that a remaining capacity of the storage battery system does not reach a charging or discharging end point within a specified period.

15. The independent system according to claim 13, wherein the control part determines whether supply of power is more or less than demand for power in the independent system,
the control part performs at least one of: control for reducing the power generated by the natural energy generating apparatus; control for reducing power generated by the power generator; and control for connecting, to the power supply system, a load that is included in the second load and has not been connected to the power supply system yet, when determining that the supply of the power is more than the demand for the power, and
the control part performs at least one of: control for increasing the power generated by the natural energy generating apparatus; control for increasing the power generated by the power generator; and control for paralleling off, from the power supply system, a load that is included in the second load and has already been connected to the power supply system, when determining that the supply of the power is less than the demand for the power.

16. The independent system according to claim 13, wherein when the storage battery system includes a plurality of units each of which can be independently charged and discharged, the control part performs, as adjustment of response characteristics of the storage battery system, at least one of:
adjustment for preferentially discharging a unit with a larger remaining capacity in the plurality of units;
adjustment for preferentially charging a unit with a smaller remaining capacity in the plurality of units;
adjustment for reducing a maximum discharge power of a unit at a temperature higher than or equal to a first preset temperature in the plurality of units;
adjustment for reducing a maximum charge power of a unit at a temperature higher than or equal to a second preset temperature in the plurality of units;
adjustment for preferentially charging and discharging a unit at a lower deterioration rate in the plurality of units; and
adjustment for preferentially charging and discharging a less deteriorated unit in the plurality of units.

17. A method for operating an independent system including a power supply system, a natural energy generating apparatus, a storage battery system, a power generator, a first load, and a second load, the method comprising the steps of:

acquiring information indicating states of the natural energy generating apparatus, the storage battery system, the power generator, the first load, and the second load when: the natural energy generating apparatus, the storage battery system, the power generator, and the first load are connected to the power supply system; the natural energy generating apparatus supplies generated power to the power supply system; the storage battery system is a regulated power supply; and the power generator performs a constant power operation; and controlling, based on the information, operations of the natural energy generating apparatus and the power generator, connection of the second load to the power supply system, and paralleling off the second load from the power supply system so that a demand-supply balance of power in the independent system is maintained, with the first load maintained to be connected to the power supply system;

wherein the second load includes a plurality of loads, a plurality of priorities are assigned to the plurality of loads, and the connection of the plurality of loads to the power supply system and the paralleling off the plurality of loads from the power supply system is controlled so that a load to which a higher priority is assigned is preferentially connected to the power supply system and a load to which a lower priority is assigned is preferentially paralleled off from the power supply system.

* * * * *